(12) United States Patent
Yeo

(10) Patent No.: US 11,631,100 B2
(45) Date of Patent: Apr. 18, 2023

(54) APPARATUS AND METHOD FOR PROVIDING ICT-BASED DRIVER-SPECIFIC EVALUATION ANALYSIS AND REWARD PLATFORM FOR TWO-WHEELED VEHICLE DRIVING

(71) Applicant: GREENRIDEAINTOP CORP., Seoul (KR)

(72) Inventor: Tae Hwan Yeo, Seoul (KR)

(73) Assignee: GREENRIDEAINTOP CORP., Seoul (KR)

( * ) Notice: Subject to any disclaimer, the term of this patent is extended or adjusted under 35 U.S.C. 154(b) by 0 days.

(21) Appl. No.: 17/962,159

(22) Filed: Oct. 7, 2022

(65) Prior Publication Data
US 2023/0030192 A1    Feb. 2, 2023

Related U.S. Application Data

(63) Continuation of application No. PCT/KR2020/006844, filed on May 27, 2020.

(30) Foreign Application Priority Data

Apr. 9, 2020    (KR) .......................... 10-2020-0043363

(51) Int. Cl.
*G06Q 30/0207*    (2023.01)
*G06Q 50/28*    (2012.01)
(Continued)

(52) U.S. Cl.
CPC .......... *G06Q 30/0215* (2013.01); *G06Q 20/10* (2013.01); *G06Q 20/389* (2013.01);
(Continued)

(58) Field of Classification Search
CPC .. G06Q 30/0215; G06Q 20/10; G06Q 20/389; G06Q 30/0645; G06Q 40/08; G06Q 50/28
(Continued)

(56) References Cited

U.S. PATENT DOCUMENTS 9,754,425 B1 *   9/2017   Iqbal ...................... G07C 5/008
10,915,964 B1 *  2/2021   Purgatorio ......... G06Q 30/0226
(Continued)

FOREIGN PATENT DOCUMENTS

JP    2005510813 A    4/2005
JP    2006524622 A    11/2006
(Continued)

OTHER PUBLICATIONS

Scola, "The Black Car Company That People Love to Hate: Cab Industry Be Warned, Uber Entered the System", Forefront Next City, Nov. 11 (Year: 2013).*
(Continued)

*Primary Examiner* — Frantzy Poinvil
(74) *Attorney, Agent, or Firm* — Burris Law, PLLC

(57) ABSTRACT

The present disclosure relates to an apparatus and a method for providing an information & communication technology (ICT)-based driver-specific evaluation analysis and compensation platform for two-wheeled vehicle driving. Particularly, the present disclosure relates to an apparatus and a method for providing a platform which creates mid-traveling driving information about a driver identified on the basis of biometrics, and which evaluates the driver on the basis of the driving information and then pays compensation to the driver according to evaluation results.

7 Claims, 7 Drawing Sheets

(51) Int. Cl.
  *G06Q 20/10* (2012.01)
  *G06Q 20/38* (2012.01)
  *G06Q 30/0645* (2023.01)
  *G06Q 40/08* (2012.01)
  *B62J 45/20* (2020.01)
  *B62J 45/10* (2020.01)
  *B62J 50/22* (2020.01)

(52) U.S. Cl.
  CPC ......... *G06Q 30/0645* (2013.01); *G06Q 40/08* (2013.01); *G06Q 50/28* (2013.01); *B62J 45/10* (2020.02); *B62J 45/20* (2020.02); *B62J 50/22* (2020.02)

(58) Field of Classification Search
  USPC ....................................................... 705/3–44
  See application file for complete search history.

(56) References Cited

U.S. PATENT DOCUMENTS

| | | | | |
|---|---|---|---|---|
| 11,544,791 | B1* | 1/2023 | Gross | G06Q 30/0215 |
| 2003/0097335 | A1 | 5/2003 | Moskowitz et al. | |
| 2004/0215480 | A1 | 10/2004 | Kadaba | |
| 2013/0085818 | A1 | 4/2013 | Gore et al. | |
| 2016/0071082 | A1* | 3/2016 | Driscoll | G07F 17/0057 705/13 |
| 2019/0279227 | A1* | 9/2019 | Chantz | G06Q 30/018 |
| 2022/0187847 | A1* | 6/2022 | Cella | G05B 19/41885 |

FOREIGN PATENT DOCUMENTS

| | | |
|---|---|---|
| KR | 1020130055599 A | 5/2013 |
| KR | 1020170125756 A | 11/2017 |
| KR | 1020190139449 A | 12/2019 |
| KR | 1020200007143 A | 1/2020 |

OTHER PUBLICATIONS

Reichohale, David, "State Farm case spurs auto policy questions", National Underwriter, Property & casualty/risk & benefits management ed. 104.2:2.18, ALM Media Poperties, LLC, Jan. 10 (Year: 2000).*

International Search Report and Written Opinion for International Application No. No. PCT/KR2020/006844, English Translation, dated Jan. 29, 2021, 12 pages.

Final Office Action issued in corresponding KR Application No. 10-2020-0043363, dated Jul. 26, 2021, and an English translation thereof, 15 pages.

Office Action issued in corresponding KR Application No. 10-2020-0043363, dated Apr. 19, 2021, and an English translation thereof, 15 pages.

Notice of Allowance issued to corresponding KR Application No. 10-2020-0043363, dated May 19, 2022, and an English translation thereof, 4 pages.

* cited by examiner

APPARATUS AND METHOD FOR PROVIDING ICT-BASED DRIVER-SPECIFIC EVALUATION ANALYSIS AND REWARD PLATFORM FOR TWO-WHEELED VEHICLE DRIVING

CROSS-REFERENCE OF RELATED APPLICATIONS AND PRIORITY

The present application is a continuation of International Application No. PCT/KR2020/006844 filed May 27, 2020 which claims priority to and benefit of Korean Patent Application No. 10-2020-0043363 filed Apr. 9, 2020, the disclosure of which are incorporated by reference as if they are fully set forth herein.

TECHNICAL FIELD

The present disclosure relates to an apparatus and method for providing an information & communication technology (ICT)-based driver-specific evaluation analysis and compensation platform for two-wheeled vehicle driving. Specifically, the present disclosure relates to an apparatus and method for generating mid-travel driving information about a driver identified on the basis of biometrics, evaluating the driver on the basis of the driving information, and then providing compensation to the driver in accordance with the evaluation results. According to various embodiments of the present disclosure, it is possible to analyze and evaluate driving information about a two-wheeled vehicle driver who performs delivery work and differentially provide an incentive in accordance with the evaluation results. Delivery information usage fees which are collected in return for providing delivery information to the two-wheeled vehicle driver may be deposited in an escrow account and then used for incentive payment, insurance fee payment, rental fee payment, etc. through a blockchain network. Also, when the collected driving information about the two-wheeled vehicle driver is provided to an insurance company and a two-wheeled vehicle rental company, information for accurately calculating insurance and rental fees for two-wheeled vehicle driving can be provided.

BACKGROUND

As the size of the delivery industry grows with the development of smartphone-based delivery applications, traffic safety issues of two-wheeled vehicles used for delivery are emerging socially. As consumers demand shorter delivery times and delivery operators and drivers want to process more deliveries in the same amount of time, two-wheeled vehicle accidents occur frequently due to reckless driving, speeding, violation of traffic laws, etc. Since the safety equipment of two-wheeled vehicles is relatively poor compared to that of general passenger cars, traffic accidents of two-wheeled vehicles often lead to human casualties, and the social cost is also increasing accordingly. The frequent traffic accidents of two-wheeled vehicle drivers performing delivery work result from an unreasonable profit distribution structure for two-wheeled vehicle drivers and a delivery service running system that jeopardizes safety. Drivers of two-wheeled vehicles who carry out delivery work perform high-risk and high-intensity driving for a long time due to profit sharing that is proportional to the number of deliveries but in which compliance with safe driving is not taken into consideration.

For social traffic safety and the stable management of delivery businesses, insurance for ensuring the traffic safety of two-wheeled vehicles is required. However, in general practice in the delivery industry, a number of drivers hired as short-term contract workers take turns driving a number of two-wheeled vehicles that a delivery company rents from a rental company. In other words, the number of drivers driving a specific two-wheeled vehicle is not fixed to one. Since a driver driving a two-wheeled vehicle used for delivery is not always the same, it is difficult to ascertain who drives the specific two-wheeled vehicle. Since it is difficult to determine who drives the specific two-wheeled vehicle, it is difficult to collect information on usual driving habits of each driver. Although it is urgent to provide insurance as a social safety net against the occurrence of unexpected accidents to two-wheeled vehicle drivers performing delivery work, insurance companies are unable to provide effective comprehensive insurance products for two-wheeled vehicles due to unacceptable insurance loss ratios and difficulties in acquiring accurate driving data. Also, since a driver is not always the same, a two-wheeled vehicle rental company cannot acquire information such as who the driver of a rented two-wheeled vehicle is, how much the rented two-wheeled vehicle has been driven, etc., and thus cannot provide a rental service at a reasonable cost. Accordingly, due to the difficulty in acquiring information on drivers of two-wheeled vehicles used for delivery, there is a problem that it is not easy to set the insurance fee for a two-wheeled vehicle or a driver and to set a rental fee for two-wheeled vehicles rented by a delivery company.

Lately, biometric recognition technology for extracting unique physical features of a person to determine whether the person is a corresponding person has been actively under development. Biometric technology is security authentication technology for confirming someone's identity by measuring his or her unique biometric information, such as fingerprints, face, irises, veins, and voice, with an automated device. Biometric technology may be used for identifying a person who accesses biometric equipment within a pool of a number of people from whom biometric information has been collected.

When there are a number of registered two-wheeled vehicles and a number of registered drivers but it is not known which driver drives which two-wheeled vehicle, biometric technology may be used for identifying who drives a specific two-wheeled vehicle. Also, when it is known who drives a two-wheeled vehicle, unique driving information about the identified driver may be generated. When there is driving information about the identified specific driver, it is possible to develop and provide insurance products and rationally calculate the cost of renting a two-wheeled vehicle on the basis of the driving information about the identified driver.

Accordingly, an apparatus and method for generating vehicle-specific and driver-specific driving information on the basis of biometrics and providing the driving information to an insurance company and a rental company are needed.

When it is possible to provide compensation to two-wheeled vehicle drivers or pay insurance fees and rental fees using delivery information usage fees collected from the drivers performing delivery work, the drivers can receive additional benefits from the necessary expenses. Accordingly, there is an incentive to provide driving information. Also, when compensation for providing driving information or insurance fees and rental fees is determined differentially in accordance with at least one of whether safe driving is performed and job evaluations that are analysis results of the driving information, there is an economic incentive for safe driving from the perspective of drivers of two-wheeled vehicles. When a driver gets more compensation than other drivers, the compensation may be an incentive, and when a driver gets less compensation than other drivers, the compensation may be a penalty.

Accordingly, an apparatus and method for providing compensation to drivers or paying insurance fees and rental fees using delivery information usage fees collected from two-wheeled vehicle drivers performing delivery work are needed.

Also, an apparatus and method for differentially determining compensation provided to a driver or an insurance fee and a rental fee to be paid in accordance with at least one of whether safe driving is performed and a job evaluation that is an analysis result of the two-wheeled-vehicle-specific and driver-specific driving information are needed.

When a compensation amount provided to a driver is deposited in the escrow account of a financial institution and information on the deposited compensation amount is shared between a management server and a driver terminal through a blockchain, information on compensation for providing driving information can be shared objectively and transparently. Also, when a token may be provided on the basis of the information on the compensation amount shared in the blockchain, the compensation amount can be conveniently used on the driver terminal.

Accordingly, an apparatus and method for sharing information on a compensation amount which is deposited in an escrow account and provided to a driver through a blockchain and providing a token are needed.

SUMMARY

The present disclosure is directed to providing an apparatus and method for generating driving information about a two-wheeled vehicle on the basis of biometrics.

The present disclosure is also directed to providing an apparatus and method for controlling starting of a two-wheeled vehicle for a driver identified on the basis of biometrics and generating driving information about the identified driver such as whether the driver performs a sudden turn, sudden acceleration, or a sudden stop, causes an impact, violates a regulation speed, etc. during travel.

The present disclosure is also directed to providing an apparatus and method for transmitting generated driver-specific driving information to an insurance company and a rental company.

The present disclosure is also directed to providing an apparatus and method for providing compensation to a driver or paying an insurance fee or a rental fee using delivery information usage fees collected from two-wheeled vehicle drivers performing delivery work.

The present disclosure is also directed to providing an apparatus and method for differentially determining compensation provided to a driver or an insurance fee and a rental fee to be paid in accordance with whether safe driving is performed as an analysis result of two-wheeled-vehicle-specific and driver-specific driving information.

The present disclosure is also directed to providing an apparatus and method for sharing information on a compensation amount which is deposited in an escrow account and provided to a driver through a blockchain and providing a token.

One aspect of the present disclosure provides an operating method of a management server including a transceiver, a memory, and at least one processor, the operating method including receiving two-wheeled-vehicle-specific and driver-specific driving information about a two-wheeled vehicle driven by a driver, which includes an identifier of the two-wheeled vehicle and an identifier of the driver, from the two-wheeled vehicle, transmitting the two-wheeled-vehicle-specific and driver-specific driving information to at least one of an insurance company server of the two-wheeled vehicle or the driver and a rental company server of the two-wheeled vehicle, and transmitting compensation information corresponding to the two-wheeled-vehicle-specific and driver-specific driving information to a driver terminal of the driver on the basis of terminal information of drivers registered in the memory.

Another aspect of the present disclosure provides a management server including a transceiver, a memory, and at least one processor and configured to perform an operating method of a management server according to various embodiments of the present disclosure.

Another aspect of the present disclosure provides a computer program configured to perform an operating method of a management server according to various embodiments of the present disclosure and recorded on a computer-readable storage medium.

The present disclosure can provide an apparatus and method for generating driving information about a two-wheeled vehicle on the basis of biometrics.

The present disclosure can also provide an apparatus and method for controlling starting of a two-wheeled vehicle for a driver identified on the basis of biometrics and generating driving information about the identified driver such as whether the driver performs a sudden turn, sudden acceleration, or a sudden stop, causes an impact, violates a regulation speed, etc. during travel.

The present disclosure can also provide an apparatus and method for transmitting generated driver-specific driving information to an insurance company and a rental company.

The present disclosure can also provide an apparatus and method for providing compensation to a driver or paying an insurance fee or a rental fee using delivery information usage fees collected from two-wheeled vehicle drivers performing delivery work.

The present disclosure can also provide an apparatus and method for differentially determining compensation provided to a driver or an insurance fee and a rental fee to be paid in accordance with whether safe driving is performed as an analysis result of two-wheeled-vehicle-specific and driver-specific driving information.

The present disclosure can also provide an apparatus and method for sharing information on a compensation amount which is deposited in an escrow account and provided to a driver through a blockchain and providing a token.

Effects of the present disclosure are not limited to those described above, and other effects which have not been described will be clearly understood by those of ordinary skill in the art from the following descriptions.

DETAILED DESCRIPTION

Hereinafter, embodiments of the present disclosure will be described in detail with reference to the accompanying drawings so that those of ordinary skill in the art can easily implement the present disclosure. The invention can be embodied in many different forms and is not limited to the embodiments described herein.

In various embodiments of the present disclosure described below, hardware-based approaches will be described as examples. However, various embodiments of the present disclosure include a technology employing both hardware and software, and thus various embodiments of the present disclosure do not exclude software-based approaches.

Figure 1:
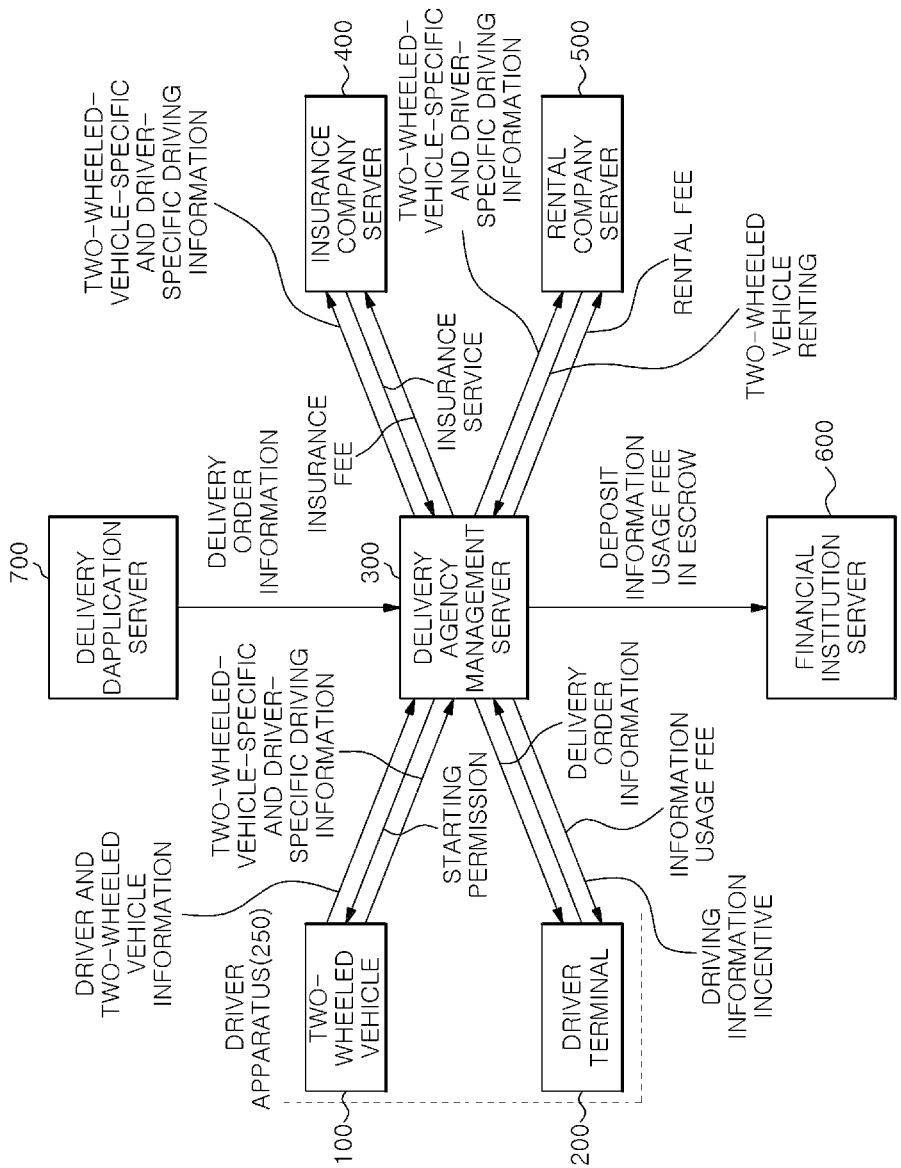
FIG. 1 is a diagram of a network system for providing insurance and a rental service for a two-wheeled vehicle and a driver on the basis of two-wheeled-vehicle-specific and driver-specific driving information according to various embodiments of the present disclosure.

FIG. 1 is a diagram of a network system for providing insurance and a rental service for a two-wheeled vehicle and a driver on the basis of two-wheeled-vehicle-specific and driver-specific driving information according to various embodiments of the present disclosure.

Referring to FIG. 1, the network system for providing an insurance and a rental service for a two-wheeled vehicle and a driver on the basis of two-wheeled-vehicle-specific and driver-specific driving information according to various embodiments of the present disclosure includes a driver apparatus 250, a management server 300 of a delivery agency, an insurance company server 400, a rental company server 500, a financial institution server 600, and a delivery application server 700. The driver apparatus 250 includes a two-wheeled vehicle 100 and a driver terminal 200.

The two-wheeled vehicle 100 and the driver terminal 200 are included in the driver apparatus 250 controllable by a driver.

On the actual delivery site, the two-wheeled vehicle 100 is driven in turn by a number of drivers employed by the delivery company. In other words, the number of drivers who drive a specific two-wheeled vehicle is not limited to one. Accordingly, even when equipment for communication with the management server 300 is installed in the two-wheeled vehicle 100, it is generally not easy for the management server 300 to find who drives the two-wheeled vehicle 100. According to various embodiments of the present disclosure, the two-wheeled vehicle 100 includes at least one biometric sensor, at least one driving information sensor, a transceiver, a memory, and at least one processor. After acquiring biometric information of a driver, the two-wheeled vehicle 100 may identify the driver on the basis of the biometric information, control starting, and generate driving information of the driver during travel. The two-wheeled vehicle 100 may transmit a driving request message including identification information of the two-wheeled vehicle 100 and identification information of the driver to the management server 300 through a communication network. When the identification information of the driver received from the two-wheeled vehicle 100 corresponds to identification information of at least one registered driver stored in the memory, the management server 100 may transmit a driving permission message that provides a notification of approval for starting control of the two-wheeled vehicle to the two-wheeled vehicle 100 through the communication network. When the driving permission message is received from the management server 300, the two-wheeled vehicle 100 may control starting to start travel. During travel, the two-wheeled vehicle 100 may transmit information on a Global Positioning System (GPS) location thereof and receive information on a regulation speed based on the GPS location of the two-wheeled vehicle 100 from the management server 300. During travel, the two-wheeled vehicle 100 may generate two-wheeled-vehicle-specific and driver-specific driving information and transmit the two-wheeled-vehicle-specific and driver-specific driving information to the management server 300 through the communication network.

According to various embodiments of the present disclosure, driving information may further include at least one of the number of times driving is unstable per unit mileage which is an average value of the number of times that a side tilt is greater than a threshold tilt during travel of a two-wheeled vehicle in a certain unit mileage, an average number of sharp turns per unit mileage which is an average value of the number of times that a turning angle is greater than a threshold rotation angle during travel of the two-wheeled vehicle in the certain unit mileage, and the number of sudden accelerations and sudden stops per unit mileage which is an average value of the number of times that the absolute value of acceleration during travel of the two-wheeled vehicle is greater than a threshold acceleration in the certain unit mileage. According to various embodiments of the present disclosure, the driving information may further include the number of violations of a regulation speed per unit mileage which is an average value of the number of times that the speed is greater than the regulation speed during travel of the two-wheeled vehicle in the certain unit mileage.

The driver terminal 200 is a terminal specific to a driver. The driver terminal 200 may receive delivery order information received by the management server 300 from the delivery application server 700. The driver performs delivery work by driving the two-wheeled vehicle 100 on the basis of the delivery order information received through the driver terminal 200. The driver should pay an information usage fee for the delivery order information to the delivery agency. Accordingly, the driver terminal 200 transmits information usage fee information of the delivery order information to the management server 300 of the delivery agency.

Also, the management server 300 may transmit compensation information for the driver to the driver terminal 200 in return for providing the two-wheeled-vehicle-specific and driver-specific driving information which is generated in the two-wheeled vehicle 100 when the driver drives the two-wheeled vehicle 100. The driver may check information on compensation, that is, insurance fee payment, rental fee payment, compensation receipt, etc., which may be received in return for providing the two-wheeled-vehicle-specific and driver-specific driving information through the driver terminal 200. The driver terminal 200 may receive differential compensation information corresponding to at least one of the two-wheeled-vehicle-specific and driver-specific driving information and a job evaluation from the management server 300. The job evaluation may include feedback of a delivery consumer about the delivery service received through the delivery application server 700 by the management server 300, a job evaluation input by a manager of the delivery agency, etc. The compensation information may include information on a transfer of a differential amount of money determined by the delivery agency in accordance with at least one of the two-wheeled-vehicle-specific and driver-specific driving information and the job evaluation from an account related to the management server 300 to an account related to the driver terminal 200. Otherwise, the compensation information may include information on a transfer of money corresponding to the two-wheeled-vehicle-specific and driver-specific driving information from the account related to the management server 300 to an escrow account of a financial institution. Otherwise, the compensation information may include information on a transfer of money corresponding to the two-wheeled-vehicle-specific and driver-specific driving information from the escrow account of the financial institution to the account related to the driver terminal 200. Otherwise, the compensation information may include at least one of insurance fee payment information and rental fee payment information about at least one of an insurance fee and a rental fee paid with money corresponding to the two-wheeled-vehicle-specific and driver-specific driving information. Otherwise, the compensation information may include information on a token in a blockchain for money corresponding to the two-wheeled-vehicle-specific and driver-specific driving information. Here, nodes constituting the blockchain include the management server 300 and at least one of the driver terminal 200, the insurance company server 400, the rental company server 500, and the financial institution server 600.

The management server 300 transmits the delivery order information received from the delivery application server 700 to the driver terminal 200. The driver performs delivery work by driving the two-wheeled vehicle 100 on the basis of the delivery order information received through the driver terminal 200. The driver should pay an information usage fee for the delivery order information to the delivery agency. Accordingly, the management server 300 receives the information usage fee information of the delivery order information from the driver terminal 200. Also, the management server 300 receives the two-wheeled-vehicle-specific and driver-specific driving information from the two-wheeled vehicle 100 and provides the received two-wheeled-vehicle-specific and driver-specific driving information to at least one of the insurance company server 400 and the rental company server 500.

The management server 300 deposits the delivery information usage fee collected from the driver in an escrow account of the financial institution. Accordingly, the management server 300 transmits information on a transfer of money corresponding to the information usage fee information from the account related to the management server 300 to the escrow account of the financial institution to the financial institution server 600. The management server 300 may disclose the information on the transfer to the escrow account of the financial institution to the network nodes constituting a blockchain through the blockchain. Specifically, the management server 300 may generate a transaction on the basis of the information on the transfer of the information usage fee from the account related to the management server 300 to the escrow account of the financial institution, generate a hash value on the basis of the transaction, and transmit the hash value to other nodes constituting the blockchain. The nodes constituting the blockchain include the management server 300 and at least one of the driver terminal 200, the insurance company server 400, the rental company server 500, and the financial institution server 600. The management server 300 determines whether information on the transfer to the escrow account has been registered in a shared ledger of the blockchain. When it is determined that the information on the transfer to the escrow account has been registered in the shared ledger of the blockchain, the management server 300 may generate information on a token in the blockchain for the money deposited in the escrow account.

Using the delivery information usage fee collected from the driver, the management server 300 may differentially pay an insurance fee for the driver or the two-wheeled vehicle to the insurance company, pay a rental fee of the two-wheeled vehicle to the rental company, or provide compensation to the driver on the basis of at least one of driving information and the job evaluation as an incentive or a penalty for the driver. The management server 300 may transmit insurance fee payment information for the two-wheeled vehicle or the driver to the insurance company server 400. The insurance fee payment information may include information on a transfer from the escrow account to an account related to the insurance company server 400 within the money deposited in the escrow account. Alternatively, the management server 300 may transmit rental fee payment information for the two-wheeled vehicle to the rental company server 500. The rental fee payment information may include information on a transfer from the escrow account to an account related to the rental company server 500 within the money deposited in the escrow account. The management server 300 may transmit compensation information corresponding to the two-wheeled-vehicle-specific and driver-specific driving information to the driver terminal 200. The compensation information may include information on a transfer of a differential amount of money determined by the delivery agency in accordance with at least one of the two-wheeled-vehicle-specific and driver-specific driving information and the job evaluation from the account related to the management server 300 to the account related to the driver terminal 200. Otherwise, the compensation information may include information on a transfer of money corresponding to the two-wheeled-vehicle-specific and driver-specific driving information from the account related to the management server 300 to the escrow account of the financial institution. Otherwise, the compensation information may include information on a transfer of money corresponding to the two-wheeled-vehicle-specific and driver-specific driving information from the escrow account of the financial institution to the account related to the driver terminal 200. Otherwise, the compensation information may include at least one of insurance fee payment information and rental fee payment information about at least one of an insurance fee and a rental fee paid with money corresponding to the two-wheeled-vehicle-specific and driver-specific driving information. Otherwise, the compensation information may include information on a token in the blockchain for money corresponding to the two-wheeled-vehicle-specific and driver-specific driving information.

The insurance company server 400 is a server managed by the insurance company for two-wheeled vehicles or drivers. The insurance company server 400 receives the two-wheeled-vehicle-specific and driver-specific driving information from the management server 300. The insurance company server 400 may transmit information on an insurance service related to the two-wheeled vehicle and the driver to the management server 300. The insurance company server 400 may receive the insurance fee payment information for the two-wheeled vehicle or the driver from the management server 300. The insurance fee payment information may include information on a transfer from the escrow account to the account related to the insurance company server 400 within the money deposited in the escrow account.

The rental company server 500 is a server managed by the rental company for two-wheeled vehicles. The rental company server 500 receives the two-wheeled-vehicle-specific and driver-specific driving information from the management server 300. The rental company server 500 may transmit information related to renting of the two-wheeled vehicle to the management server 300. The rental company server 500 may receive the rental fee payment information for the two-wheeled vehicle from the management server 300. The rental fee payment information may include information on a transfer from the escrow account to the account related to the rental company server 500 within the money deposited in the escrow account.

The financial institution server 600 receives information on a transfer of money corresponding to the delivery information usage fee collected from the driver from the account related to the management server 300 to the escrow account of the financial institution. The financial institution server 600 may constitute the blockchain network together with the management server 300 on the basis of the money deposited in the escrow account. The management server 300 may generate information on a token in the blockchain for the money deposited in the escrow account and then share the information in the blockchain with the financial institution server 600. Also, the financial institution server 600 may support a real money transfer in accordance with movement of the token between nodes in the blockchain.

The delivery application server 700 transmits the delivery order information received through a delivery application of a smartphone, a personal computer, etc. to the management server 300 of the delivery agency. Also, the delivery application server 700 may transmit feedback of the delivery consumer about the delivery service to the management server 300. The feedback of the delivery consumer about the delivery service may be used for the management server 300 to generate a job evaluation for the driver.

Figure 2:
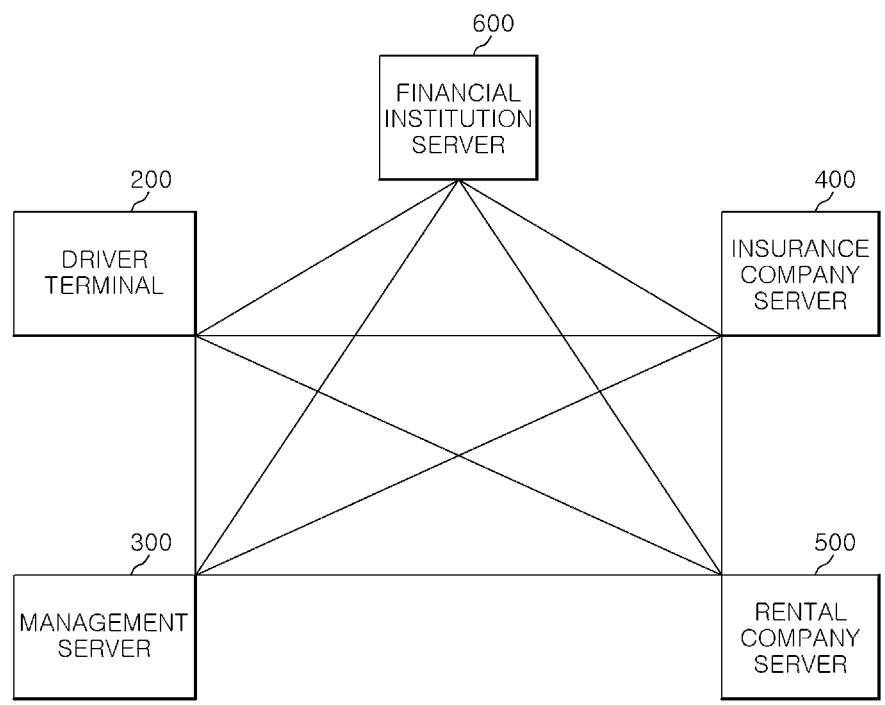
FIG. 2 is a diagram of a blockchain network system according to various embodiments of the present disclosure.

FIG. 2 is a diagram of a blockchain network system according to various embodiments of the present disclosure.

Referring to FIG. 2, nodes constituting the blockchain may include the driver terminal 200 and the management server 300. Also, nodes constituting the blockchain may further include at least one of the insurance company server 400, the rental company server 500, and the financial institution server 600.

The management server 300 may disclose information on a transfer of money corresponding to delivery information usage fees collected from two-wheeled vehicle drivers performing delivery work to the escrow account of the financial institution to the network nodes constituting the blockchain through the blockchain. Specifically, the management server 300 may generate a transaction on the basis of information on a transfer of money corresponding to two-wheeled-vehicle-specific and driver-specific driving information from the account related to the management server to an escrow account of the financial institution specified for a driver, generate a hash value on the basis of the transaction, and transmit the hash value to other nodes constituting the blockchain. Compensation payment to the driver is started using the blockchain, and thus it is possible to ensure objectivity, transparency, reliability, fairness, and a real-time characteristic of a compensation algorithm.

The management server 300 may determine whether the information on the transfer to the escrow account has been registered in a shared ledger of the blockchain. When it is determined that the information on the transfer to the escrow account has been registered in the shared ledger, the management server 300 may generate information on a token in the blockchain for the money deposited in the escrow account.

The management server 300 may transmit a token of a certain amount to the driver terminal 200 as differential compensation corresponding to at least one of the two-wheeled-vehicle-specific and driver-specific driving information and a job evaluation. Also, the management server 300 may transmit a token corresponding to an insurance fee or a rental fee to the insurance company server 400 or the rental company server 500 as differential compensation corresponding to at least one of the two-wheeled-vehicle-specific and driver-specific driving information and the job evaluation.

The driver may use the token in the blockchain as cryptocurrency. The driver may pay an insurance fee for the driver or a two-wheeled vehicle or a rental fee for the two-wheeled vehicle by transferring the token in the blockchain to the insurance company server 400 or the rental company server 500 through the driver terminal 200. The financial institution server 600 may manage the money deposited in the escrow account in accordance with the driver's token use. The driver may make an investment in stocks, bonds, etc. by transferring the token in the blockchain to the financial institution server 600 through the driver terminal 200.

The financial institution server 600 may constitute a blockchain network together with the management server 300 on the basis of the money deposited in the escrow account. The management server 300 may generate information on the token in the blockchain network for the money deposited in the escrow account and then share the information on the token in the blockchain with the financial institution server 600 and other nodes. Also, the financial institution server 600 may support a real money transfer in accordance with movement of the token between nodes in the blockchain.

Figure 3:
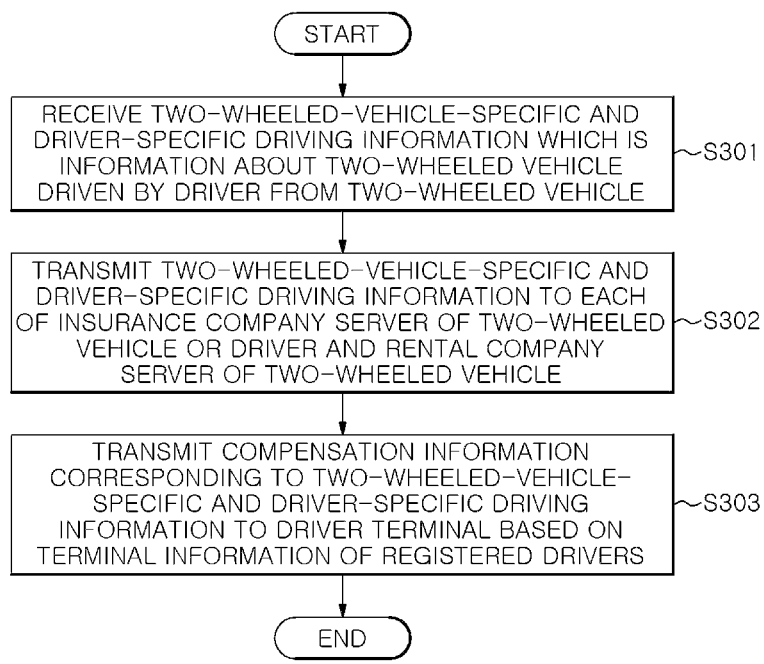
FIG. 3 is a flowchart illustrating an operating process of a management server according to various embodiments of the present disclosure.

FIG. 3 is a flowchart illustrating an operating process of a management server according to various embodiments of the present disclosure.

In the embodiment of FIG. 3, the management server includes a transceiver, a memory, and at least one processor.

According to various embodiments of the present disclosure, before operation S301, the management server may receive a driving request message including identification information of a driver from a two-wheeled vehicle. When it is determined that the driver is a registered driver on the basis of a comparison between the received identification information and identification information of registered drivers stored in the memory, the management server may transmit a driving permission message to the two-wheeled vehicle. According to various embodiments of the present disclosure, the received identification information may be biometric information of the driver, the identification information of the registered drivers stored in the memory may be biometric information of the registered drivers, and the biometric information may include at least one of vein information, iris information, face information, voice information, and fingerprint information. According to various embodiments of the present disclosure, the two-wheeled vehicle includes a starting control module, and the starting control module controls starting of the two-wheeled vehicle in accordance with the driving permission message.

According to various embodiments of the present disclosure, before operation S301, the management server may receive the driving request message including identification information of the driver from the two-wheeled vehicle. When it is determined that the driver is a registered driver on the basis of a comparison between the received identification information and identification information of registered drivers stored in the memory, the management server may transmit the driving permission message to the two-wheeled vehicle. In this case, it may be determined in the two-wheeled vehicle whether the driver is a registered driver on the basis of biometrics, and the management server may receive the driving request message including an identifier corresponding to the biometric information of the driver from the two-wheeled vehicle. When it is determined that the driver is a registered driver on the basis of the identifier, the management server may transmit the driving permission message to the two-wheeled vehicle.

According to various embodiments of the present disclosure, before operation S301, the management server may receive delivery order information from a delivery application server, transmit the delivery order information to the driver terminal, receive information usage fee information of the delivery order information from the driver terminal, and transmit information on a transfer of money corresponding to the information usage fee information from an account related to the management server to an escrow account of the financial institution to the financial institution server.

In operation S301, the management server receives two-wheeled-vehicle-specific and driver-specific driving information about the two-wheeled vehicle driven by the driver from the two-wheeled vehicle. The two-wheeled-vehicle-specific and driver-specific driving information includes an identifier of the two-wheeled vehicle and the identifier of the driver. According to various embodiments of the present disclosure, the two-wheeled vehicle may include a driving information sensor, and the driving information sensor may include at least one of a GPS sensor, a gyroscope sensor, a geomagnetic sensor, and an acceleration sensor. The two-wheeled-vehicle-specific and driver-specific driving information may include at least one of a side tilt during travel of the two-wheeled vehicle, a rotation angle during travel of the two-wheeled vehicle, an acceleration during travel of the two-wheeled vehicle, a speed during travel of the two-wheeled vehicle, whether an impact has occurred during travel of the two-wheeled vehicle, and whether violation of a regulation speed has occurred on the travel route of the two-wheeled vehicle.

In operation S302, the management server transmits the two-wheeled-vehicle-specific and driver-specific driving information to at least one of an insurance company server of the two-wheeled vehicle or the driver and a rental company server of the two-wheeled vehicle.

In operation S303, the management server transmits compensation information corresponding to the two-wheeled-vehicle-specific and driver-specific driving information to the driver terminal of the driver on the basis of terminal information of drivers registered in the memory. According to various embodiments of the present disclosure, the management server may generate driver evaluation information about the driver on the basis of the two-wheeled-vehicle-specific and driver-specific driving information and differentially generate compensation information on the basis of the driver evaluation information. According to various embodiments of the present disclosure, the driver evaluation information may include at least one of the number of times driving is unstable per unit mileage which is an average value of the number of times that the side tilt is greater than a threshold tilt during travel of the two-wheeled vehicle in a certain unit mileage, an average number of sharp turns per unit mileage which is an average value of the number of times that a rotation angle is greater than a threshold rotation angle during travel of the two-wheeled vehicle in the certain unit mileage, the number of sudden accelerations and sudden stops per unit mileage which is an average value of the number of times that the absolute value of acceleration during travel of the two-wheeled vehicle is greater than a threshold acceleration in the certain unit mileage, and the number of violations of a regulation speed on the travel route of the two-wheeled vehicle. Differentially generated compensation information may be an incentive when a driver gets more compensation than other drivers, and may be a penalty when a driver gets less compensation than other drivers.

According to various embodiments of the present disclosure, the management server may differentially generate compensation information on the basis of a job evaluation and then transmit the compensation information to the driver terminal. The job evaluation may include feedback of a delivery consumer of the delivery service received through the delivery application server 700 by the management server 300, a job evaluation input by a manager of a delivery agency, etc. Differentially generated compensation information may be an incentive when a driver gets more compensation than other drivers, and may be a penalty when a driver gets less compensation than other drivers.

According to various embodiments of the present disclosure, the management server may differentially generate compensation information on the basis of at least one of the two-wheeled-vehicle-specific and driver-specific driving information and the job evaluation and transmit the compensation information to the driver terminal.

According to various embodiments of the present disclosure, the management server may transmit insurance fee payment information related to the two-wheeled vehicle or the driver to the insurance company server or transmit rental fee payment information related to the two-wheeled vehicle to the rental company server. Also, the compensation information may include at least one of the insurance fee payment information and the rental fee payment information.

According to various embodiments of the present disclosure, the compensation information may include information on a transfer of money corresponding to the two-wheeled-vehicle-specific and driver-specific driving information from an account related to the management server to an account related to the driver terminal.

According to various embodiments of the present disclosure, the compensation information may include information on a transfer of the money corresponding to the two-wheeled-vehicle-specific and driver-specific driving information from the account related to the management server to the escrow account of the financial institution.

According to various embodiments of the present disclosure, the compensation information may include information on a transfer of the money corresponding to the two-wheeled-vehicle-specific and driver-specific driving information from the escrow account of the financial institution to the account related to the driver terminal 200.

According to various embodiments of the present disclosure, the compensation information may include information on a token in the blockchain for the money corresponding to the two-wheeled-vehicle-specific and driver-specific driving information. Here, nodes constituting the blockchain may include the management server and at least one of the driver terminal, the insurance company server, the rental company server, and the financial institution server.

According to various embodiments of the present disclosure, the management server may generate a transaction on the basis of information on a transfer of money corresponding to delivery information usage fees collected from two-wheeled vehicle drivers performing delivery work from the account related to the management server to the escrow account of the financial institution, generate a hash value on the basis of the transaction, and transmit the hash value to other nodes constituting the blockchain. According to various embodiments of the present disclosure, the nodes constituting the blockchain may include the management server and at least one of the driver terminal, the insurance company server, the rental company server, and the financial institution server. According to various embodiments of the present disclosure, the management server may determine whether information on the transfer to the escrow account has been registered in a shared ledger of the blockchain. When it is determined that the information on the transfer to the escrow account has been registered in the shared ledger of the blockchain, the management server may generate information on a token in the blockchain for the money deposited in the escrow account.

According to various embodiments of the present disclosure, a management server configured to perform the above-described method may be provided.

According to various embodiments of the present disclosure, a computer program which is configured to perform the above-described method and stored in a computer-readable storage medium may be provided.

Figure 4:
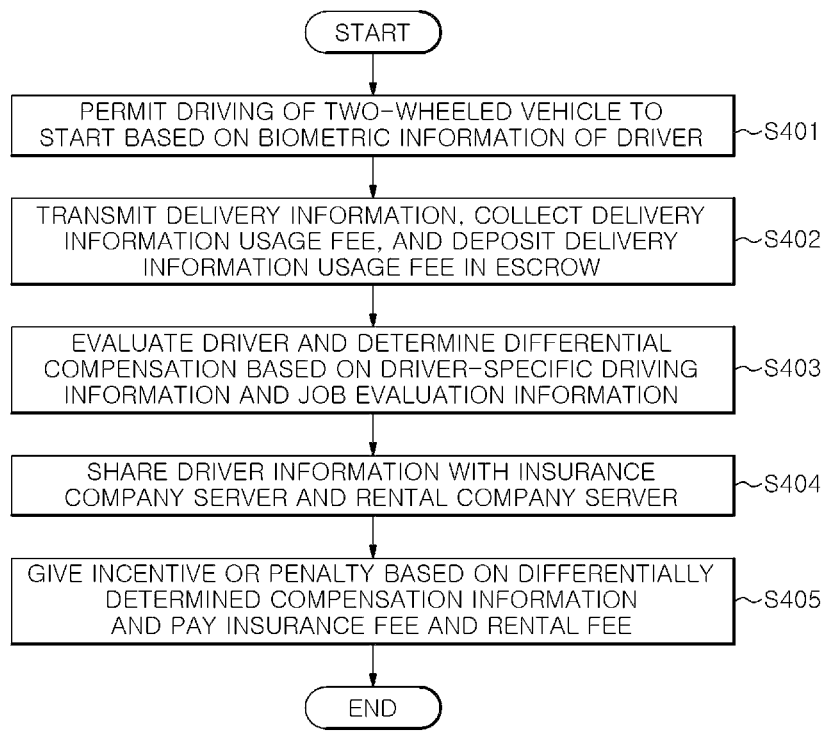
FIG. 4 is a flowchart illustrating an operating process of a management server according to various embodiments of the present disclosure.

FIG. 4 is a flowchart illustrating an operating process of a management server according to various embodiments of the present disclosure.

In the embodiment of FIG. 4, the management server includes a transceiver, a memory, and at least one processor.

In operation S401, the management server permits a driver to start driving, that is, start, a two-wheeled vehicle on the basis of biometric information of the driver. The management server may receive a driving request message including identification information of the driver from the two-wheeled vehicle. When it is determined that the driver is a registered driver on the basis of a comparison between the received identification information and identification information of registered drivers stored in the memory, the management server may transmit a driving permission message to the two-wheeled vehicle. According to various embodiments of the present disclosure, the received identification information may be the biometric information of the driver, the identification information of the registered drivers stored in the memory may be biometric information of the registered drivers, and the biometric information may include at least one of vein information, iris information, face information, voice information, and fingerprint information. According to various embodiments of the present disclosure, the two-wheeled vehicle includes a starting control module, and the starting control module controls starting of the two-wheeled vehicle in accordance with the driving permission message.

According to various embodiments of the present disclosure, the management server may receive a driving request message including the identification information of the driver from the two-wheeled vehicle. When it is determined that the driver is a registered driver on the basis of a comparison between the received identification information and identification information of registered drivers stored in the memory, the management server may transmit a driving permission message to the two-wheeled vehicle. In this case, it may be determined in the two-wheeled vehicle whether the driver is a registered driver on the basis of biometrics, and the management server may receive the driving request message including an identifier corresponding to the biometric information of the driver from the two-wheeled vehicle. When it is determined that the driver is a registered driver on the basis of the identifier, the management server may transmit the driving permission message to the two-wheeled vehicle.

In operation S402, the management server transmits delivery information to the driver terminal, collects a delivery information usage fee from the driver terminal, and deposits the delivery information usage fee in an escrow account of the financial institution. The management server may receive delivery order information from the delivery application server, transmit the delivery order information to the driver terminal, receive information usage fee information of the delivery order information from the driver terminal, and transmit information on a transfer of money corresponding to the information usage fee information from an account related to the management server to the escrow account of the financial institution.

According to various embodiments of the present disclosure, the management server deposits the delivery information usage fee collected from the driver in the escrow account of the financial institution. Accordingly, the management server transmits information on the transfer of the money corresponding to the information usage fee information from the account related to the management server to the escrow account of the financial institution to the financial institution server 600. The management server may disclose the information on the transfer to the escrow account of the financial institution to the network nodes constituting a blockchain through the blockchain. Specifically, the management server may generate a transaction on the basis of the information on the transfer of the information usage fee from the account related to the management server to the escrow account of the financial institution, generate a hash value on the basis of the transaction, and transmit the hash value to other nodes constituting the blockchain. The nodes constituting the blockchain include the management server and at least one of the driver terminal, the insurance company server, the rental company server, and the financial institution server. The management server determines whether information on the transfer to the escrow account has been registered in a shared ledger of the blockchain. When it is determined that the information on the transfer to the escrow account has been registered in the shared ledger of the blockchain, the management server may generate information on a token in the blockchain for the money deposited in the escrow account.

In operation S403, the management server evaluates the driver on the basis of at least one of driver-specific driving information and job evaluation information and determines differential compensation. Differentially generated compensation information may be an incentive when a driver gets more compensation than other drivers, and may be a penalty when a driver gets less compensation than other drivers.

The management server receives two-wheeled-vehicle-specific and driver-specific driving information which is information about the two-wheeled vehicle driven by the driver from the two-wheeled vehicle. The two-wheeledvehicle-specific and driver-specific driving information includes an identifier of the two-wheeled vehicle and the identifier of the driver. According to various embodiments of the present disclosure, the two-wheeled vehicle may include a driving information sensor, and the driving information sensor may include at least one of a GPS sensor, a gyroscope sensor, a geomagnetic sensor, and an acceleration sensor. The two-wheeled-vehicle-specific and driver-specific driving information may include at least one of a side tilt during travel of the two-wheeled vehicle, a rotation angle during travel of the two-wheeled vehicle, an acceleration during travel of the two-wheeled vehicle, a speed during travel of the two-wheeled vehicle, whether an impact has occurred during travel of the two-wheeled vehicle, and whether violation of a regulation speed has occurred on the travel route of the two-wheeled vehicle.

The management server transmits compensation information corresponding to the two-wheeled-vehicle-specific and driver-specific driving information to the driver terminal of the driver on the basis of terminal information of the drivers registered in the memory. According to various embodiments of the present disclosure, the management server may generate driver evaluation information about the driver on the basis of the two-wheeled-vehicle-specific and driver-specific driving information and differentially generate compensation information on the basis of the driver evaluation information. According to various embodiments of the present disclosure, the driver evaluation information may include at least one of the number of times driving is unstable per unit mileage which is an average value of the number of times that the side tilt is greater than a threshold tilt during travel of the two-wheeled vehicle in a certain unit mileage, an average number of sharp turns per unit mileage which is an average value of the number of times that a rotation angle is greater than a threshold rotation angle during travel of the two-wheeled vehicle in the certain unit mileage, the number of sudden accelerations and sudden stops per unit mileage which is an average value of the number of times that the absolute value of acceleration during travel of the two-wheeled vehicle is greater than a threshold acceleration in the certain unit mileage, and the number of violations of a regulation speed on the travel route of the two-wheeled vehicle. Differentially generated compensation information may be an incentive when a driver gets more compensation than other drivers, and may be a penalty when a driver gets less compensation than other drivers.

According to various embodiments of the present disclosure, the management server may differentially generate compensation information on the basis of the job evaluation and then transmit the compensation information to the driver terminal. The job evaluation may include feedback of a delivery consumer about the delivery service received through the delivery application server by the management server, a job evaluation input by a manager of a delivery agency, etc. Differentially generated compensation information may be an incentive when a driver gets more compensation than other drivers, and may be a penalty when a driver gets less compensation than other drivers.

According to various embodiments of the present disclosure, the management server may differentially generate compensation information on the basis of at least one of the two-wheeled-vehicle-specific and driver-specific driving information and the job evaluation and then transmit the compensation information to the driver terminal.

According to various embodiments of the present disclosure, the management server may transmit insurance fee payment information related to the two-wheeled vehicle or the driver to the insurance company server or transmit rental fee payment information related to the two-wheeled vehicle to the rental company server. Also, the compensation information may include at least one of the insurance fee payment information and the rental fee payment information.

According to various embodiments of the present disclosure, the compensation information may include information on a transfer of money corresponding to the two-wheeled-vehicle-specific and driver-specific driving information from the account related to the management server to an account related to the driver terminal.

According to various embodiments of the present disclosure, the compensation information may include information on a transfer of the money corresponding to the two-wheeled-vehicle-specific and driver-specific driving information from the account related to the management server to the escrow account of the financial institution.

According to various embodiments of the present disclosure, the compensation information may include information on a transfer of the money corresponding to the two-wheeled-vehicle-specific and driver-specific driving information from the escrow account of the financial institution to the account related to the driver terminal.

According to various embodiments of the present disclosure, the compensation information may include information on a token in the blockchain for the money corresponding to the two-wheeled-vehicle-specific and driver-specific driving information. Here, nodes constituting the blockchain may include the management server and at least one of the driver terminal, the insurance company server, the rental company server, and the financial institution server.

In operation S404, the management server may share driver information with the insurance company server and the rental company server. The management server transmits the two-wheeled-vehicle-specific and driver-specific driving information to at least one of the insurance company server of the two-wheeled vehicle or the driver and the rental company server of the two-wheeled vehicle.

According to various embodiments of the present disclosure, the management server may share the driver information with at least one of the insurance company server and the rental company server of the two-wheeled vehicle which are nodes included in the blockchain through the blockchain network.

According to various embodiments of the present disclosure, the driver information shared by the management server may include at least one of the two-wheeled-vehicle-specific and driver-specific driving information, driver-specific driving evaluation information, driver-specific job evaluation information, and driver-specific compensation information. The insurance company server and the rental company server of the two-wheeled vehicle may calculate an insurance fee, a rental fee, etc. on the basis of the shared driver information.

In operation S405, the management server may give an incentive or a penalty on the basis of compensation information differentially determined for each driver and pay at least one of the insurance fee and the rental fee.

According to various embodiments of the present disclosure, the management server may differentially transfer money corresponding to the compensation information to the account related to the driver terminal on the basis of the money deposited in escrow.

According to various embodiments of the present disclosure, the management server may transmit the blockchain token generated on the basis of the money deposited in escrow to the driver terminal as a token corresponding to the compensation information.

According to various embodiments of the present disclosure, the management server may differentially transfer at least one of the insurance fee and the rental fee corresponding to the driver on the basis of money deposited in escrow to the account of at least one of the insurance company and the rental company in accordance with the compensation information.

According to various embodiments of the present disclosure, the management server may differentially transmit a blockchain token corresponding to at least one of the insurance fee and the rental fee corresponding to the driver to at least one of the insurance company and the rental fee company in accordance with the compensation information on the basis of the money deposited in escrow.

When it is possible to provide compensation to drivers or pay insurance fees and rental fees using delivery information usage fees collected from two-wheeled vehicle drivers performing delivery work, the drivers can receive additional benefits from the necessary expenses, and thus there is an incentive to provide driving information. Also, when compensation for providing driving information or insurance fees and rental fees is determined differentially in accordance with at least one of whether safe driving is performed and job evaluations that are analysis results of the driving information, there is an economic incentive for safe driving from the perspective of drivers of two-wheeled vehicles. When a driver gets more compensation than other drivers, the compensation may be an incentive, and when a driver gets less compensation than other drivers, the compensation may be a penalty.

According to various embodiments of the present disclosure, a management server configured to perform the above-described method may be provided.

According to various embodiments of the present disclosure, a computer program which is configured to perform the above-described method and stored in a computer-readable storage medium may be provided.

Figure 5:
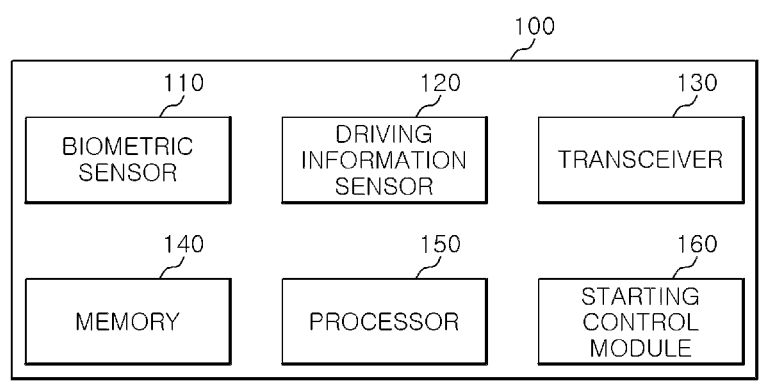
FIG. 5 is a block diagram of a two-wheeled vehicle according to various embodiments of the present disclosure.

FIG. 5 is a block diagram of a two-wheeled vehicle according to various embodiments of the present disclosure.

Referring to FIG. 5, the two-wheeled vehicle 100 according to various embodiments of the present disclosure includes at least one biometric sensor 110, at least one driving information sensor 120, a transceiver 130, a memory 140, at least one processor 150, and a starting control module 160.

The at least one biometric sensor 110 includes at least one of a vein recognition sensor, an iris recognition sensor, a face recognition sensor, a voice recognition sensor, and a fingerprint recognition sensor. The at least one biometric sensor 110 is configured to generate biometric information of a driver of the two-wheeled vehicle 100. The biometric information includes at least one of vein information, iris information, face information, voice information, and fingerprint information.

The at least one driving information sensor 120 includes at least one of a GPS sensor, a gyroscope sensor, a geomagnetic sensor, and an acceleration sensor. The at least one driving information sensor 120 is configured to generate driving information of the driver of the two-wheeled vehicle 100. The driving information includes at least one of a side tilt during travel of the two-wheeled vehicle 100, a rotation angle during travel of the two-wheeled vehicle 100, acceleration during travel of the two-wheeled vehicle 100, speed during travel of the two-wheeled vehicle 100, whether an impact has occurred during travel of the two-wheeled vehicle 100, and a travel route of the two-wheeled vehicle 100. According to an embodiment, the driving information may further include whether the two-wheeled vehicle 100 violates a regulation speed which is based on whether a speed during travel of the two-wheeled vehicle 100 is greater than the regulation speed based on the GPS location of the two-wheeled vehicle 100.

The transceiver 130 is connected to the at least one processor 150 and transmits and/or receives signals. The whole or a part of the transceiver 130 may be referred to as a transmitter, a receiver, or a transceiver. The transceiver 130 may support at least one of various wireless communication standards of wired access systems and wireless access systems, such as an Institute of Electrical and Electronics Engineers (IEEE) 802.XX system, an IEEE Wi-Fi system, a third generation partnership project (3GPP) system, a 3GPP Long Term Evolution (LTE) system, a 3GPP fifth generation (5G) new radio (NR) system, a third generation partnership project 2 (3GPP2) system, Bluetooth, etc.

The memory 140 may be connected to the at least one biometric sensor 110 and the at least one driving information sensor 120 and store the biometric information of the driver of the two-wheeled vehicle generated by the at least one biometric sensor 110, driving information of the driver of the two-wheeled vehicle 100 generated by the driving information sensor 120, etc. Also, the memory 140 may be connected to the transceiver 130 and store images, information, etc. received through communication. Also, the memory 140 may be connected to the at least one processor 150 and store data such as a basic program, application programs, and setting information for operations of the at least one processor 150, information generated by computation of the at least one processor 150, etc. The memory 140 may be configured as a volatile memory, a non-volatile memory, or a combination of a volatile memory and a non-volatile memory. Also, the memory 140 may provide the stored data in accordance with a request from the at least one processor 150.

The at least one processor 150 may be configured to implement procedures and/or methods proposed in the present disclosure. The at least one processor 150 controls overall operations of the two-wheeled vehicle 100 for generating driver-specific starting control and driving information of the two-wheeled vehicle 100 on the basis of biometrics. For example, the at least one processor 150 generates biometric information of the driver of the two-wheeled vehicle 100 through the at least one biometric sensor 110. Also, the at least one processor 150 generates driving information of the driver of the two-wheeled vehicle 100 through the at least one driving information sensor 120. Also, the at least one processor 150 transmits or receives information or the like through the transceiver 130. Also, the at least one processor 150 records or reads data on or from the memory 140.

The starting control module 160 controls starting of the two-wheeled vehicle 100 in accordance with a driving permission message transmitted from the management server of a delivery agency on the basis of the biometric information. The starting control module 160 may be configured as at least one processor that is electrically connected to a starting device of the two-wheeled vehicle 100.

Additionally, the two-wheeled vehicle 100 may further include a GPS module. The at least one processor 150 may be configured to transmit information on the GPS location of the two-wheeled vehicle 100 determined by the GPS module to the management server 300 through the transceiver 130.

Additionally, the two-wheeled vehicle 100 may further include at least one of a display and a speaker. When a specific condition of abnormal travel is satisfied, the at least one processor 150 may control at least one of the display and the speaker to output a warning sign or a warning sound to the driver of the two-wheeled vehicle 100.

Additionally, the two-wheeled vehicle 100 may further include an input unit. The input unit may be connected to the at least one processor 150, and identification information of a new driver of the two-wheeled vehicle 100 and the like may be input to the input unit. According to an embodiment, the input unit may include a touch display, a keypad, etc.

Figure 6:
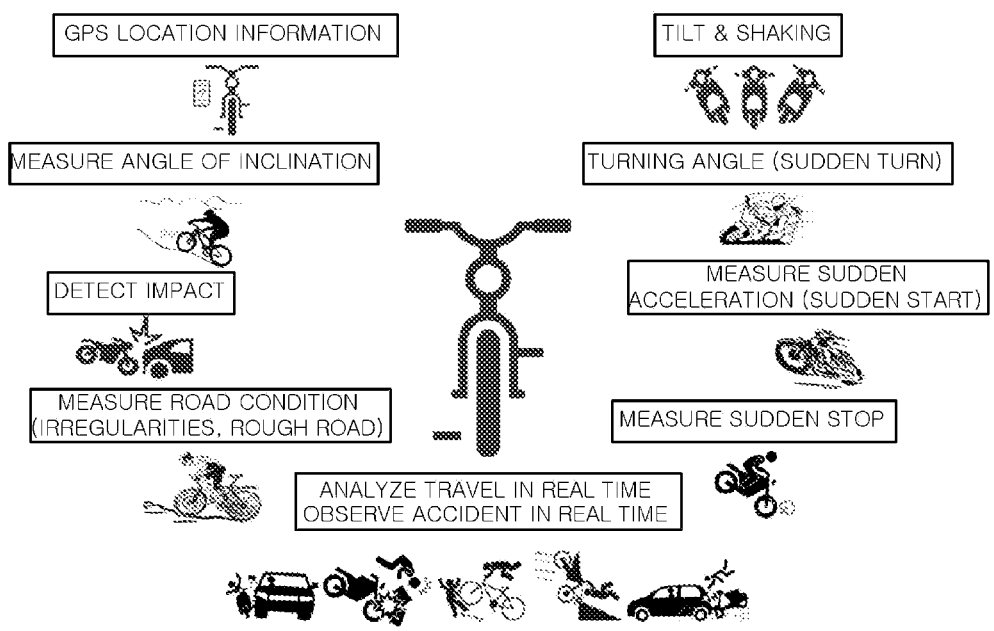
FIG. 6 is a diagram illustrating a process of generating driving information of a driver during travel of a two-wheeled vehicle according to various embodiments of the present disclosure.

FIG. 6 is a diagram illustrating a process of generating driving information of a driver during travel of a two-wheeled vehicle according to various embodiments of the present disclosure.

Specifically, FIG. 6 shows examples of various types of driving information that may be generated by at least one driving information sensor included in a two-wheeled vehicle.

According to various embodiments of the present disclosure, the at least one driving information sensor may include at least one of a GPS sensor, a gyroscope sensor, a geomagnetic sensor, and an acceleration sensor.

According to various embodiments of the present disclosure, the driving information may include at least one of a side tilt during travel of the two-wheeled vehicle, a rotation angle during travel of the two-wheeled vehicle, an acceleration during travel of the two-wheeled vehicle, a speed during travel of the two-wheeled vehicle, whether an impact has occurred during travel of the two-wheeled vehicle, whether an accident has occurred during travel of the two-wheeled vehicle, the GPS location of the two-wheeled vehicle, the angle of inclination of a road on which the two-wheeled vehicle has traveled, the condition of a road on which the two-wheeled vehicle has traveled, and a travel route of the two-wheeled vehicle.

According to various embodiments of the present disclosure, the driving information may further include at least one of whether the two-wheeled vehicle has traveled unstably based on whether the side tilt during travel of the two-wheeled vehicle is greater than a threshold tilt, whether the two-wheeled vehicle has made a sudden turn based on whether a rotation angle during travel of the two-wheeled vehicle is greater than a threshold rotation angle, whether an accident has occurred based on whether the value of an amount of impact occurring during travel of the two-wheeled vehicle is greater than the value of a threshold amount of impact, road condition information based on whether the value of shaking during travel of the two-wheeled vehicle is greater than the value of threshold shaking, and whether the two-wheeled vehicle has made a sudden acceleration or a sudden stop based on whether the absolute value of acceleration during travel of the two-wheeled vehicle is greater than a threshold acceleration.

According to various embodiments of the present disclosure, the driving information may further include at least one of the number of times driving is unstable per unit mileage which is an average value of the number of times that the side tilt is greater than the threshold tilt during travel of the two-wheeled vehicle in a certain unit mileage, an average number of sharp turns per unit mileage which is an average value of the number of times that a rotation angle is greater than the threshold rotation angle during travel of the two-wheeled vehicle in the certain unit mileage, and the number of sudden accelerations and sudden stops per unit mileage which is an average value of the number of times that the absolute value of acceleration during travel of the two-wheeled vehicle is greater than the threshold acceleration in the certain unit mileage.

According to various embodiments of the present disclosure, the driving information may further include the number of violations of a regulation speed per unit mileage which is an average value of the number of times that the speed is greater than the regulation speed during travel of the two-wheeled vehicle in the certain unit mileage.

Figure 7:
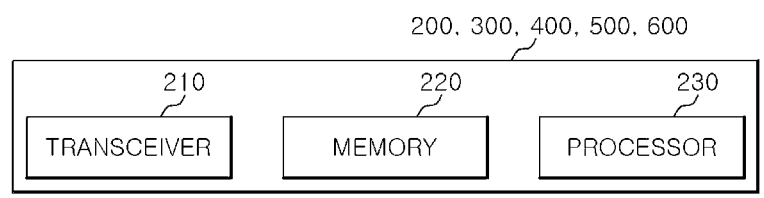
FIG. 7 is a block diagram of network nodes, such as a management server and the like, according to various embodiments of the present disclosure.

FIG. 7 is a block diagram of network nodes, such as a management server and the like, according to various embodiments of the present disclosure.

Specifically, FIG. 7 shows a block diagram of network nodes such as the driver terminal 200, the management server 300, the insurance company server 400, the rental company server 500, the financial institution server 600, etc.

Referring to FIG. 7, the network nodes 200, 300, 400, 500, and 600 each include a transceiver 210, a memory 220, and at least one processor 230.

The transceiver 210 is connected to the at least one processor 230 and transmits and/or receives signals. The whole or a part of the transceiver 210 may be referred to as a transmitter, a receiver, or a transceiver. The transceiver 210 may support at least one of various wireless communication standards of wired access systems and wireless access systems, such as an IEEE 802.XX system, an IEEE Wi-Fi system, a 3GPP system, a 3GPP LTE system, a 3GPP 5G NR system, a 3GPP2 system, Bluetooth, etc.

The memory 220 may be connected to the transceiver 210 and store information received through communication and the like. Also, the memory 220 may be connected to the at least one processor 230 and store data such as a basic program, application programs, and setting information for operations of the at least one processor 230, information generated by computation of the at least one processor 230, etc. The memory 220 may be configured as a volatile memory, a non-volatile memory, or a combination of a volatile memory and a non-volatile memory. Also, the memory 220 may provide the stored data in accordance with a request from the at least one processor 230.

The at least one processor 230 may be configured to implement procedures and/or methods proposed in the present disclosure. Also, the at least one processor 230 transmits or receives information or the like through the transceiver 210. Also, the at least one processor 230 records or reads data on or from the memory 220.

When embodiments of the present disclosure are implemented using hardware, application-specific integrated circuits (ASICs), digital signal processors (DSPs), digital signal processing devices (DSPDs), programmable logic devices (PLDs), field programmable gate arrays (FPGAs), etc. configured to perform the present disclosure may be provided in a processor of the present disclosure.

Meanwhile, the above-described methods can be written as a program executable by a computer and may be implemented by a general-use digital computer that executes the program using a computer-readable recording medium. Also, the structure of data used in the above-described methods may be recorded on a computer-readable storage medium through various means. Program storage devices used for description of a storage device containing executable computer code for executing various methods of the present disclosure are not understood to include temporary objects such as carrier waves or signals. The computer-readable storage medium includes a storage medium such as a magnetic storage medium (e.g., a read-only memory (ROM), a floppy disk, a hard disk, etc.) or an optical recording medium (e.g., a compact disc (CD)-ROM, a digital versatile disc (DVD), etc.).

In the above-described embodiments, components and features of the present disclosure are combined in a certain form. Each component or feature should be considered to be optional unless explicitly stated otherwise. Each component or feature may be implemented in a form in which it is not combined with other components or features. Also, it is possible to configure an embodiment of the present disclosure by combining some components and/or features. The order of operations described in the embodiments of the invention may be changed. Some configurations or features of an embodiment may be included in other embodiments or replaced with corresponding configurations or features of other embodiments. It is obvious that claims that do not explicitly cite each other in the appended claims can be combined into an embodiment or included as a new claim by amendment after the application is filed.

It will be apparent to those of ordinary skill in the art that the present disclosure can be implemented in other forms without departing from the technical spirit and fundamental features of the present disclosure. Therefore, the above embodiments should be considered in all aspects as illustrative and not restrictive. The scope of the present disclosure should be determined by a reasonable interpretation of the appended claims and all possible changes within the equivalency range of the present disclosure.

The present disclosure relates to an apparatus and method for providing an information & communication technology (ICT)-based driver-specific evaluation analysis and compensation platform for two-wheeled vehicle driving. Specifically, the present disclosure relates to an apparatus and method for generating mid-travel driving information about a driver identified on the basis of biometrics, evaluating the driver on the basis of the driving information, and then providing compensation to the driver in accordance with the evaluation results. According to various embodiments of the present disclosure, it is possible to analyze and evaluate driving information about a two-wheeled vehicle driver who performs delivery work and differentially provide an incentive in accordance with the evaluation results. Delivery information usage fees which are collected in return for providing delivery information to the two-wheeled vehicle driver may be deposited in an escrow account and then used for incentive payment, insurance fee payment, rental fee payment, etc. through a blockchain network. Also, when the collected driving information about the two-wheeled vehicle driver is provided to an insurance company and a two-wheeled vehicle rental company, information for accurately calculating insurance and rental fees for two-wheeled vehicle driving can be provided.

The invention claimed is:

1. An operating method of a management server including a transceiver, a memory, and at least one processor, the operating method comprising:
receiving delivery order information from a delivery application server;
transmitting the delivery order information to a driver terminal corresponding to a driver of a two-wheeled vehicle;
receiving payment information of an information usage fee corresponding to the delivery order information for the management server from the driver terminal;
transmitting information on a transfer of money corresponding to the information usage fee from an account related to the management server to an escrow account of a financial institution to a financial institution server;
transmitting the information on the transfer of the money corresponding to the information usage fee from the account related to the management server to the escrow account to other nodes constituting a blockchain, wherein the nodes constituting the blockchain include at least one of the driver terminal, an insurance company server of the two-wheeled vehicle or the driver, a rental company server of the two-wheeled vehicle, and the financial institution server and the management server;
generating information on a token in the blockchain for the money transferred to the escrow account;
receiving two-wheeled-vehicle-specific and driver-specific driving information about the two-wheeled vehicle driven by the driver, which includes an identifier of the two-wheeled vehicle and an identifier of the driver, from the two-wheeled vehicle;
transmitting the two-wheeled-vehicle-specific and driver-specific driving information to at least one of the insurance company server of the two-wheeled vehicle or the driver and the rental company server of the two-wheeled vehicle;
comparing the two-wheeled-vehicle-specific and driver-specific driving information with other two-wheeled-vehicle-specific and driver-specific driving information of registered other drivers stored in the memory to differentially calculate at least one of an insurance fee for the two-wheeled vehicle or the driver and a rental fee for the two-wheeled vehicle to be larger or smaller than at least one of insurance fees and rental fees of the other drivers in association with at least one of the insurance company server and the rental company server;
transmitting compensation information corresponding to the two-wheeled-vehicle-specific and driver-specific driving information to the driver terminal of the driver using the money corresponding to the information usage fee on the basis of terminal information of the registered drivers stored in the memory, wherein the compensation information is differentially generated to be larger or smaller than compensation information of the registered other drivers by comparing the two-wheeled-vehicle-specific and driver-specific driving information with the other two-wheeled-vehicle-specific and driver-specific driving information of the registered other drivers stored in the memory;
transferring a token in the blockchain on the basis of money corresponding to the compensation information within the money transferred to the escrow account to pay at least one of the insurance fee and the rental fee; and
transmitting at least one of insurance fee payment information and rental fee payment information to at least one of the insurance company server and the rental company server, wherein at least one of the insurance fee payment information and the rental fee payment information includes information on a transfer of money from the escrow account to an account related to at least one of the insurance company server and the rental company server within the money transferred to the escrow account.

2. The operating method of claim 1, further comprising, before the receiving of the two-wheeled-vehicle-specific and driver-specific driving information:
receiving a driving request message including the identifier of the two-wheeled vehicle and identification information of the driver from the two-wheeled vehicle; and when it is determined that the driver is a registered driver on the basis of a comparison between the received identification information and identification information of the registered drivers stored in the memory, transmitting a driving permission message to the two-wheeled vehicle, wherein the two-wheeled vehicle includes a biometric sensor, the received identification information is biometric information of the driver, the identification information of the registered drivers stored in the memory is biometric information of the registered drivers, the biometric information includes at least one of vein information, iris information, face information, voice information, and fingerprint information, the two-wheeled vehicle includes a starting control module, and the starting control module controls starting of the two-wheeled vehicle in accordance with the driving permission message.

3. The operating method of claim 1, wherein the two-wheeled vehicle includes a driving information sensor which includes at least one of a Global Positioning System (GPS) sensor, a gyroscope sensor, a geomagnetic sensor, and an acceleration sensor, and the two-wheeled-vehicle-specific and driver-specific driving information includes at least one of a side tilt during travel of the two-wheeled vehicle, a turning angle during travel of the two-wheeled vehicle, an acceleration during travel of the two-wheeled vehicle, an acceleration during travel of the two-wheeled vehicle, a speed during travel of the two-wheeled vehicle, whether an impact has occurred during travel of the two-wheeled vehicle, and whether violation of a regulation speed has occurred on a travel route of the two-wheeled vehicle.

4. The operating method of claim 1, further comprising:
generating driver evaluation information about the driver on the basis of the two-wheeled-vehicle-specific and driver-specific driving information; and
differentially generating the compensation information on the basis of the driver evaluation information, wherein the driver evaluation information includes at least one of:

a number of times driving is unstable per unit mileage which is an average value of a number of times that a side tilt is greater than a threshold tilt during travel of the two-wheeled vehicle in a certain unit mileage;

an average number of sharp turns per unit mileage which is an average value of a number of times that a turning angle is greater than a threshold turning angle during travel of the two-wheeled vehicle in the certain unit mileage;

a number of sudden accelerations and sudden stops per unit mileage which is an average value of a number of times that an absolute value of acceleration during travel of the two-wheeled vehicle is greater than a threshold acceleration in the certain unit mileage; and a number of violations of a regulation speed on a travel route of the two-wheeled vehicle.

5. The operating method of claim 1, further comprising:
determining whether the information on the transfer to the escrow account is registered in a shared ledger of the blockchain;

when it is determined that the information on the transfer to the escrow account is registered in the shared ledger, generating the information on the token in the blockchain for the money transferred to the escrow account; and transmitting the information on the token to the other nodes constituting the blockchain, wherein the compensation information includes information on a token in the blockchain for money corresponding to the two-wheeled-vehicle-specific and driver-specific driving information.

6. A management server including a transceiver, a memory, and at least one processor, wherein the management server is configured to perform the operating method of claim 1.

7. A computer program configured to perform the operating method of claim 1 and recorded on a computer-readable storage medium.

* * * * *